Nov. 19, 1929.                 H. S. LA DUKE                 1,736,122
                               EGG BOILING CUP
                              Filed Nov. 16, 1928
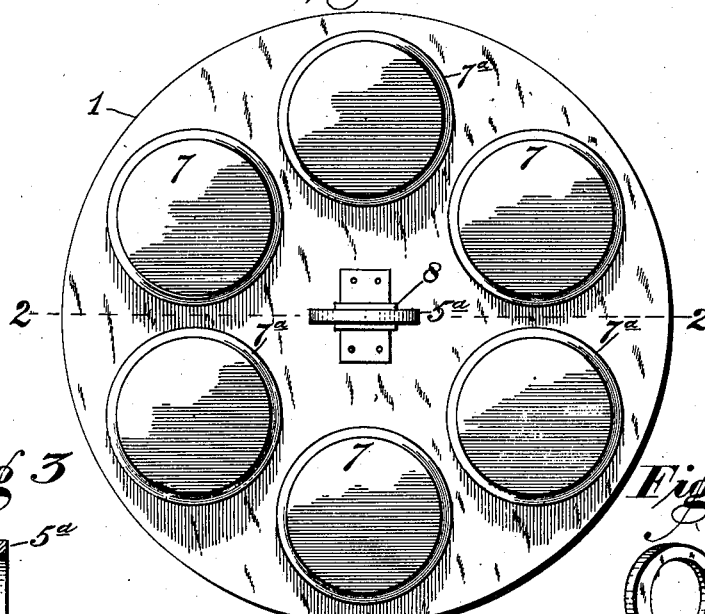
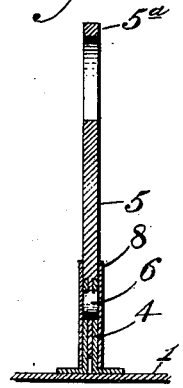
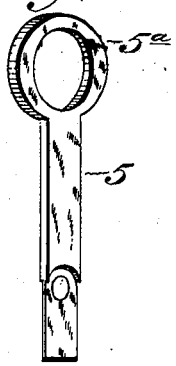
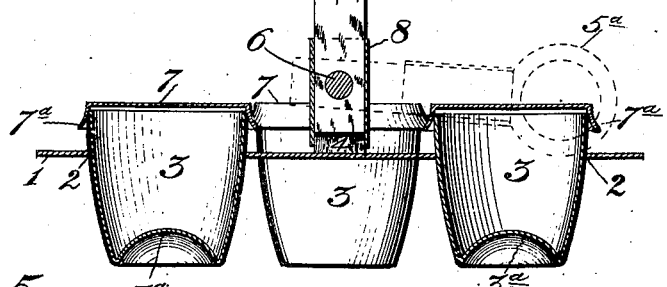
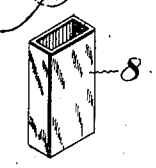
INVENTOR.
Helen S. La Duke,
BY E. E. Overholt
ATTORNEY.

Patented Nov. 19, 1929

1,736,122

UNITED STATES PATENT OFFICE

HELEN SOPHIA LA DUKE, OF IRON MOUNTAIN, MICHIGAN

EGG-BOILING CUP

Application filed November 16, 1928. Serial No. 319,941.

My invention relates to kitchen articles, and more particularly to an egg-boiling device.

My object is to provide a device of this character in which the eggs may be removed from the shells for purposes of inspection, and for seasoning, before they are boiled, and will yet each one be boiled separately just as if they had remained in their respective shells.

Another object is to provide a device which will handle a number of eggs at one time (when placing them in the boiler and removing them therefrom), and that may be placed in a comparatively shallow covered vessel for purposes of boiling or steaming the eggs.

A specific object in view is to provide for the device a central handle which may be folded down out of the way when the device is to be placed in a shallow receptacle for boiling or steaming purposes, but which will be automatically rendered rigid when raised to its vertical position, so that the rack in which the egg cups are held will not tip unduly to one side when a cup with its contents is removed from the rack, or when two or more adjacent cups are removed.

Other objects will appear in the subjoined description.

A leading feature of the invention consists of a central handle provided with a joint permitting it to be folded down out of the way when the device is to be placed in a comparatively shallow covered boiler or steamer, but having a loose collar which, when the free upper end of the handle is raised to its vertical position, slides down by gravity and locks the two sections of the handle in alinement with each other.

The invention consists in certain novel features of construction and arrangement of parts, as will be hereinafter described and claimed, reference being had to the accompanying drawings, in which:—

Fig. 1 is a top plan view of the device.

Fig. 2 is a vertical section of Fig. 1, on the line 2—2.

Fig. 3 is a central vertical section of the folding handle taken in a plane at right angles to the plane in which the free end of the handle swings to its folded positon.

Fig. 4 is a perspective view of the upper section of the folding handle; and

Fig. 5 is a perspective view of the sliding collar which automatically locks the two sections of the handle in rigid relation to each other when the upper section is swung up into vertical alinement with the lower section.

Referring further to the drawings, the numeral 1 indicates a circular plate or rack provided with openings 2 for the reception of the egg cups 3.

In the centre of the plate 1 is the handle of the device, which handle is formed of the short lower section 4, and the upper section 5, which terminates at its upper end in a band or ring $5^a$. The lower section 4 is secured to the plate 1 in any desired manner, as by soldering, brazing, or riveting. The section 5 is secured to the section 4 by means of the short pivot 6 (Fig. 3).

The cups 3 are tapered from a short distance from their tops to their bottoms, so that they will always set snugly in the openings 2. Special attention is called to the construction of the bottoms of these cups which bottoms are pronouncedly concaved, as clearly indicated at $3^a$. These cups are provided with covers or lids 7, which have outwardly flaring annular flanges $7^a$; and the inner diameter of these lids is just slightly less than the outer diameter of the tops of the cups, so that the lids will fit practically air tight on the cups.

The handle of the device is provided with a sleeve 8, shown in perspective in Fig. 5, which sleeve is sufficiently loose to slip down on the handle by gravity, when the upper part 5 of the handle is raised to its vertical position.

When the egg shells have been opened and the eggs poured out of them into the cups— an egg into each cup—for inspection and also to be properly seasoned, the lids 7 are pressed down tightly on their respective cups; and the cups are then placed in the openings 2 in the receiving rack or plate 1. The device is then ready to be set in a vessel with more or less water in it, which when boiled for a little while will cook the eggs. The time required is usually from three to five minutes, according to the degree of hardness desired.

The device is intended to be used with a boiling vessel of such a size that the periphery of the plate 1 will engage the inner periphery of the vessel and will not go clear down therein, but will hold the device up so that the bottoms of the cups 3 will be above the bottom of the boiling vessel.

It will be noticed that there is an even number of openings 2 in the plate 1, from which it follows that each one of the cups has another of the cups diametrically opposite to it; from which it further follows that each space between any two adjacent cups will have a similar space diametrically opposite to it. The pivot 6 which connects the two sections of the handle together, extends at right angles to the vertical plane passing diametrically through two of these opposing spaces, so that the upper end 5 of the handle swings up and down in this plane, and thus may be swung down on either side into engagement with the plate 1, always coming between the cups, and thus permitting said free end 5 of the handle to fold down as far as possible, while at the same time keeping it always out of the way of the cups.

Whether the cups 3 be set down in the water, or whether the water be poured in the boiling vessel after the device has been placed in operative position therein; in either case, air will be trapped in the concave bottoms 3ª of the cups; and the air cushion thus formed at the bottom of each cup where the cup is exposed to the greatest heat, will in a measure insulate that portion of the cup from the excess heat to which it is exposed, and will thus cause the egg to cook evenly, and will prevent it from cooking harder at the bottom of the cup, and possibly sticking thereto, which would prevent the egg from pouring out of the cup easily when brought to the table.

When the boiling process has been going on for a while, and the steam begins to rise rapidly from the bottom of the boiling vessel it will displace in large measure, the air trapped in the concave bottoms 3ª of the cups, and will fill the vacated spaces with steam, which will insure that the portion of the egg at the bottom of a cup will also be thoroughly cooked before the cooking process is finished. But the idea is that in order to insure that the eggs shall not be overcooked and stick to the bottoms of the cups and thus be difficult to remove from the cups, the cooking process begins at the upper part of the cups and proceeds downwardly and is finished at the bottom, instead of beginning at the bottom as is the case with ordinary cups when used in devices of this kind.

The fact that the lids 7 fit the cups tightly, will cause them to hold all the aroma and flavor of the eggs in the cups.

The fact that the flange 7ª of the lid flares outwardly at its lower edge, makes it easy to remove the lids from the cups, even though they be fitted very tightly thereon.

When the device is placed in the boiling vessel, the sleeve 8 is simply moved upwardly onto the upper section 5 of the handle. This frees the joint of the handle and permits said upper section 5 to be folded down into the position indicated in dotted lines in Fig. 2, which enables the device to be placed in a very shallow boiling vessel and covered up, so that the cups will be completely surrounded by steam and boiling water.

When the device is to be lifted from the boiling vessel, the upper section 5 of the handle is swung upwardly to the vertical position, and this causes the sleeve 8 to automatically drop down by gravity and lock the joint, as indicated in Figs. 2 and 3 of the drawings. This holds the joint rigid, which is desirable in order that the device may be held against easily tipping to one side when one of the cups is removed from the plate 1. This tendency would, of course, be greater if two adjacent cups chance to be removed at one time, as might easily be the case.

From the foregoing, it will be seen that I have provided an egg cooker which is simple, neat, and compact, and which thoroughly meets all the requirements of such a device; and which may be used with equal advantage in the cooking of puddings, custards, and in short, any food which is desired to be cooked in separate cups.

Having now described my invention, what I claim as new and desire to protect by Letters Patent is:—

1. In a device of the character described, an egg cup having a concave bottom and a lid of slightly less diameter than the outer diameter of the top of the cup, said lid having a downwardly-extending flared annular flange, whereby to adapt the lid to fit the cup tightly, with the flange of the lid presented to the easy grasp of the operator for removing the lid from the cup.

2. An egg cup having its lower portion arranged to be submerged in boiling water, and having its bottom externally formed into an air recess for insulating the bottom of the cup against the rising column of heat during the initial boiling process.

In testimony whereof I affix my signature.

HELEN SOPHIA LA DUKE.